(12) United States Patent
Morgan

(10) Patent No.: US 7,676,460 B2
(45) Date of Patent: Mar. 9, 2010

(54) TECHNIQUES FOR PROVIDING SUGGESTIONS FOR CREATING A SEARCH QUERY

(75) Inventor: Brian Stephen Morgan, Londonderry, NH (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/367,931

(22) Filed: Mar. 3, 2006

(65) Prior Publication Data

US 2007/0208738 A1    Sep. 6, 2007

(51) Int. Cl.
G06F 7/00 (2006.01)
G06F 17/30 (2006.01)

(52) U.S. Cl. .................... 707/4; 707/5; 707/6
(58) Field of Classification Search ...... 707/1, 707/4, 2, 3, 5, 6
See application file for complete search history.

(56) References Cited

U.S. PATENT DOCUMENTS

| | | | | |
|---|---|---|---|---|
| 5,265,065 | A * | 11/1993 | Turtle ............................ | 707/4 |
| 5,794,178 | A | 8/1998 | Caid et al. | |
| 5,896,321 | A * | 4/1999 | Miller et al. ........... | 365/189.15 |
| 6,006,225 | A * | 12/1999 | Bowman et al. ................ | 707/5 |
| 6,169,986 | B1 * | 1/2001 | Bowman et al. ................ | 707/5 |
| 6,292,794 | B1 * | 9/2001 | Cecchini et al. ................ | 707/3 |
| 6,377,965 | B1 * | 4/2002 | Hachamovitch et al. .... | 715/203 |
| 6,411,950 | B1 * | 6/2002 | Moricz et al. .................. | 707/3 |
| 6,460,029 | B1 * | 10/2002 | Fries et al. ...................... | 707/3 |
| 6,546,399 | B1 * | 4/2003 | Reed et al. ............... | 707/104.1 |
| 6,578,022 | B1 | 6/2003 | Foulger et al. | |
| 6,684,202 | B1 * | 1/2004 | Humphrey et al. ............ | 706/45 |
| 6,701,309 | B1 * | 3/2004 | Beeferman et al. ............. | 707/3 |
| 6,751,606 | B1 * | 6/2004 | Fries et al. ..................... | 707/3 |
| 6,760,700 | B2 * | 7/2004 | Lewis et al. ................. | 704/235 |
| 6,922,670 | B2 | 7/2005 | Yamada et al. | |
| 6,944,612 | B2 * | 9/2005 | Roustant et al. ................ | 707/3 |
| 7,152,064 | B2 * | 12/2006 | Bourdoncle et al. ............ | 707/5 |
| 7,263,517 | B2 * | 8/2007 | Sheu et al. ...................... | 707/3 |
| 7,325,201 | B2 * | 1/2008 | Ferrari et al. ................ | 715/737 |
| 7,461,059 | B2 * | 12/2008 | Richardson et al. ............ | 707/5 |
| 2005/0210383 | A1 * | 9/2005 | Cucerzan et al. ............ | 715/533 |
| 2005/0234881 | A1 * | 10/2005 | Burago et al. ................... | 707/3 |

(Continued)

OTHER PUBLICATIONS

Endeca Technologies, Inc., "Endeca InFront for E-Commerce", [online], 2006, [retrieved on Mar. 22, 2006], retrieved from the Internet at <URL: http://endeca.com/solutions/e-commerce_search.html>.

(Continued)

*Primary Examiner*—James Trujillo
*Assistant Examiner*—Jorge A Casanova
(74) *Attorney, Agent, or Firm*—Janaki K. Davda; Konrad Raynes & Victor LLP

(57) ABSTRACT

Provided are techniques for providing suggestions for a search query. As input of a search query is received, it is determined that the input corresponds to a stem. It is determined whether the stem resolves to a predetermined term. In response to determining that the input resolves to a predetermined term, a new query is generated based on the predetermined term and zero or more previously resolved terms. In response to executing the new query, results are received and suggestions for completing the search query are provided based on the received results.

21 Claims, 8 Drawing Sheets

U.S. PATENT DOCUMENTS

| | | | | |
|---|---|---|---|---|
| 2005/0283468 | A1* | 12/2005 | Kamvar et al. | 707/3 |
| 2006/0010126 | A1* | 1/2006 | Anick et al. | 707/4 |
| 2006/0190436 | A1* | 8/2006 | Richardson et al. | 707/3 |
| 2006/0206454 | A1* | 9/2006 | Forstall et al. | 707/3 |
| 2006/0253427 | A1* | 11/2006 | Wu et al. | 707/3 |
| 2006/0259479 | A1* | 11/2006 | Dai | 707/4 |
| 2007/0038619 | A1* | 2/2007 | Norton et al. | 707/4 |

OTHER PUBLICATIONS

Endeca Technologies, Inc., "Interactive Reporting with Endeca Latitude", [online], 2006, [retrieved on Mar. 22, 2006], retrieved from the internet at <URL: http://endeca.com/solutions/analytics.html>.

Bauer, M., D. Dengler, & G. Paul, "Instructible Information Agents for Web Mining", *Proceedings of the 5th International Conference on Intelligent User Interfaces*, 2000, pp. 21-28.

Berendt, B., & M. Spiliopoulou, "Analysis of Navigation Behaviour in Web Sites Integrating Multiple Information Systems", *The VLDB Journal*, 2000,9: 56-75.

Brajnik, G., S. Mizzaro, & C. Tasso, "Evaluating User Interfaces to Information Retrieval Systems: A Case Study on User Support", *Proceedings of the 19th Annual International ACM SIGIR Conference on Research and Development in Information Retrieval*, 1996, pp. 128-136.

Google, "Google Suggest Beta", [online], 2006, [Retrieved on Feb. 22, 2006], retrieved from the Internet at <URL: http://www.google.com/webhp?complete=I&h1=en>.

Leak, D.B., A. Maguitman, T. Reichherzer, A.J. Canas, M. Carvalho, M. Arguedas, S. Brenes, & T. Eskridge, "Aiding Knowledge Capture by Searching for Extensions of Knowledge Models", *Proceedings of the 2nd International Conference on Knowledge Capture*, Oct. 2003, pp. 44-53.

Mikemoran.Com, "Multifaceted Search- What Can it do for You?", [online], [Retrieved on Feb. 28, 2006], retrieved from the Internet at <URL: http://www.mikemoran.com/cgi-bin/LMprint.cgi?referrer=http://www.mikemoran.com/corporates . . . >.

* cited by examiner

TECHNIQUES FOR PROVIDING SUGGESTIONS FOR CREATING A SEARCH QUERY

BACKGROUND

1. Field

Embodiments of the invention relate to providing suggestions for creating a search query.

2. Description of the Related Art

The World Wide Web (web) may be described as a large collection of Internet servers, and a web browser may be described as enabling access to documents on the collection of Internet servers. Because of the large number of documents available, typically, a search engine is used to locate particular documents. Many search engines (e.g., the Google™ search engine) accept keywords as search queries. Thus, many web users have been trained to input keywords to such search engines, and it is difficult for these users to make the shift to take advantage of the benefits of natural language queries. Natural language queries may be described as ones based on human language parameters or natural conversation syntax (e.g., "define natural language" or "which flowers are blue?"). The Google™ search engine also offers a Google™ Suggest product that offers suggestions as a user types a search query.

Notwithstanding current techniques, there is a need in the art for providing suggestions for creating a search query, especially a natural language query.

SUMMARY OF EMBODIMENTS OF THE INVENTION

Provided are a method, computer program product, and system for providing suggestions for a search query. As input of a search query is received, it is determined that the input corresponds to a stem. It is determined whether the stem resolves to a predetermined term. In response to determining that the input resolves to a predetermined term, a new query is generated based on the predetermined term and zero or more previously resolved terms. In response to executing the new query, results are received and suggestions for completing the search query are provided based on the received results.

BRIEF DESCRIPTION OF THE DRAWINGS

Referring now to the drawings in which like reference numbers represent corresponding parts throughout:

FIG. 3 illustrates use of a custom command in a sample user interface in accordance with certain embodiments.

FIG. 4 illustrates use of an attribute in a sample user interface in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
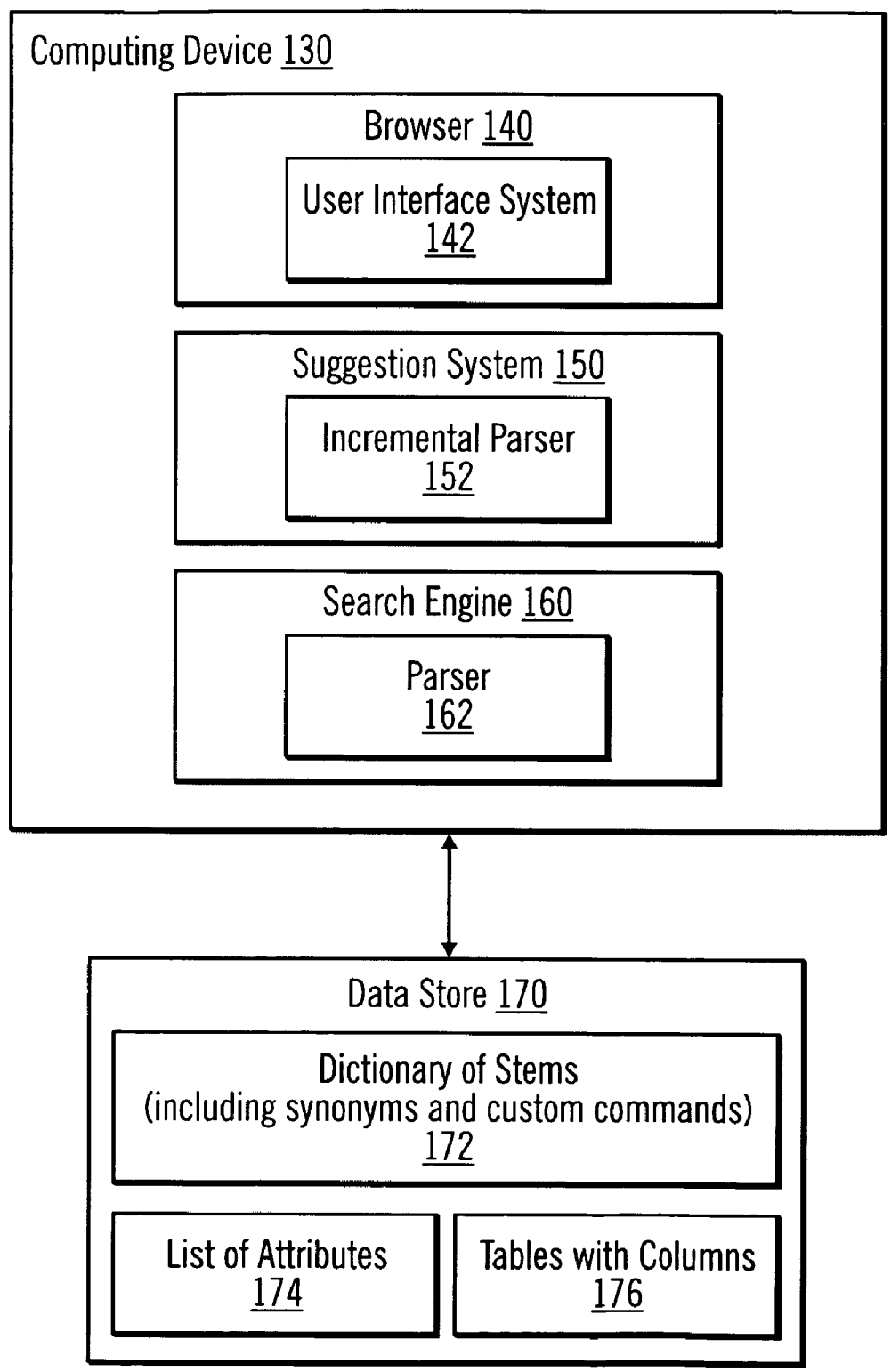
FIG. 1 illustrates details of a computing device in accordance with certain embodiments.

FIG. 1 illustrates details of a computing device 130 in accordance with certain embodiments. A computing device 130 includes a browser 140, a suggestion system 150, and a search engine 160, and may include other components (not shown). The browser 140 enables searching web sites. The browser 140 hosts a user interface system 142 that exposes the ability to submit search requests to the search engine 160 and view responses from the search engine 160. The search engine 160 enables locating one or more particular documents from a large set of documents (e.g., on the web). The search engine 160 includes a parser 162 for parsing input of a search query. The suggestion system 150 includes an incremental parser 152. The suggestion system 150 works with the incremental parser 152 to provide suggestions for a search query as the search query is being input (e.g., via computer keyboard or other input). The suggestion system 150 and incremental parser 152 work to provide intelligent, context-dependent suggestions to a user for completing a search query. The term context may be described as a previous state of a search query that has been captured by the suggestion system 150. In particular, the suggestion system 150 maintains a record of resolved terms based on a set of predetermined terms (i.e., terms that match attributes (e.g., "brand"), custom commands (e.g., define), certain predetermined terms (e.g., "with" or "show"), portions of attributes, or partial attribute values) and unresolved terms (i.e., terms that are not resolved). Also, there are some terms that are determined not to be "matches" (e.g., the term "phones" input on a cell phone commerce website), as these terms are not useful in providing further suggestions. Thus, the suggestion system 150 is able to offer suggestions that have value in the current state (i.e. the suggestion system 150 provides suggestions to help find a result given previous constraints (i.e., the resolved part of the query)).

The suggestion system 150 helps a user automatically complete an information request, such as a search query. As the user provides inputs (e.g., keystrokes), the suggestion system 150 passes the input to the search engine 160. The parser 162 of the search engine 160 parses the keystrokes into tokens (e.g., "terms" or "stems", where a stem may be a token or a portion of a token)). The parser 162 identifies information (e.g., attributes and custom commands) that is passed back to the suggestion system 150 for processing. Additionally, the suggestion system may generate and submit queries to the search engine 160 to retrieve results that may be used to offer suggestions for additional tokens to complete the search query. For instance, if the user types "define", the system realizes the user is looking for the definition for some concept and provides a list of terms representing concepts for which context-relevant definitions are available.

Although not shown, the search engine 160 may also include a crawler for locating documents, an indexer for indexing documents, etc.

The computing device 130 is coupled to a data store 170. The data store 170 includes a dictionary of stems (including synonyms for terms and custom commands) 172, a list of attributes 174, and tables with columns 176.

The dictionary of stems 172 includes portions of tokens and entire tokens. For entire tokens, the dictionary of stems may also include one or more synonyms. For example, the dictionary of stems may include the following:

Define (Custom Command)
Definition (Custom Command)
. . .
Run
Runs
Running
. . .
Through—Synonym Carrier In certain embodiments, the dictionary of stems 172 optionally identifies terms that are custom commands. Examples of custom commands are "define" to obtain a definition (e.g., from a glossary) and "what is" (i.e., to obtain information from frequently asked questions information).

In certain embodiments, the tables with columns 176 are part of a database. For purposes of illustration, Table A is a sample table with columns 176:

TABLE A

Cell Phones

| Brand | Phone Identifier | Price | Carrier | ... |
|-------|------------------|-------|---------|-----|
| LG    | VX4500           | 55.00 | Cingular |    |
| LG    | VX4500           | 55.00 | Verizon  |    |

The attributes in the list of attributes 174 provide metadata that dictates where information about each attribute is stored in an index and in the tables with columns 176 and also identifies the relationship of the attribute to other terms (i.e., synonyms). Thus, the list of attributes 174 enables correlating synonyms found in the dictionary of stems 172 with attributes in the list of attributes 174. For example, one attribute may be "Carrier", and synonyms for this attribute may be "provider" and "through", and information about "carrier" may be stored as the fourth column in a particular table (e.g., Table A). For Table A, the following are attributes that would be included in the list of attributes 174, along with additional information:

Brand
Phone Identifier
Price
Carrier
...

In certain embodiments, the search engine 160 and parser 162 use the dictionary of stems 172, list of attributes 174, and tables with columns 176 to identify terms input by a user.

In certain embodiments, the computing device 130 is a client computer. In certain alternative embodiments, the computing device 130 is a server computer that is couple to and provides a client computer with access to data in the data store 170. Thus, the suggestion system 150 may be implemented at a client computer, a server computer or other computer. In yet other embodiments, the browser 140 resides at a client computer coupled to a server computer, and the suggestion system 150 and the search engine 160 reside on the server computer.

In alternative embodiments, the components of the computing device 130 may be implemented as hardware, software, or a combination of hardware and software.

The data store 170 may comprise, for example, an array of storage devices, such as Direct Access Storage Devices (DASDs), Just a Bunch of Disks (JBOD), Redundant Array of Independent Disks (RAID), virtualization device, etc.

The suggestion system 150 helps teach a user the use of natural language queries by providing insight into search results before the user actually submits a complete search query. That is, the incremental parser 152 identifies terms that form combinations, and the suggestion system 150 provides feedback to the user in the form of suggestions for completing the search query.

Although certain examples make reference to actions by a user (e.g., inputting a search query), such actions may be implemented by an application (e.g., another search engine submitting a search query to search engine 160 via browser 140).

Figure 2:
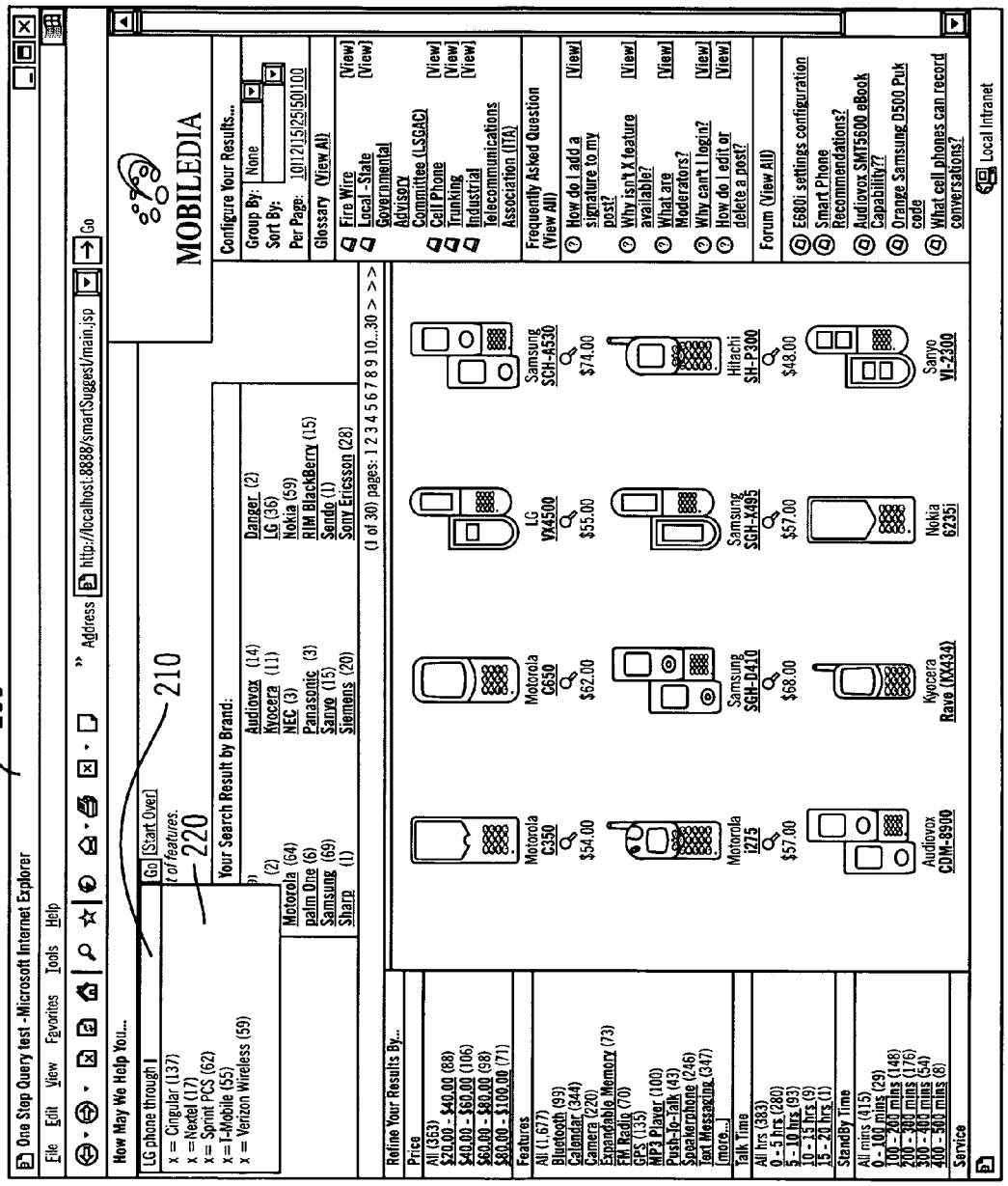
FIG. 2 illustrates a sample user interface in accordance with certain embodiments.

FIG. 2 illustrates a sample user interface 200 in accordance with certain embodiments. User interface 200 provides access to a cell phone commerce website. The user interface 200 includes a query area 210 into which input of a search query may be submitted (e.g., by a user). The suggestion system 150 provides suggestions in a suggestion area 220. In certain embodiments, the query area 210 is a text box, while the suggestion area is a drop down list box. With user interface 200, if a user types in "LG phones through" in the query area 210, the suggestion system 150 interprets "LG" as a brand and interprets "through" as "carrier" and provides suggestions of carriers (e.g., Cingular) that provide LG phones in the suggestion area 220. That is, the suggestion system 150 recognizes that the user is looking for a cell phone service provider, and, rather than providing suggestions of all cell phone providers, the suggestion system 150 provides suggestions of those that provide LG phones. Thus, the suggestion system 150 provides suggestions based on context.

Moreover, the suggestion system 150 leverages techniques for supporting multi-faceted search, while recognizing which facets provide appropriate suggestions and which facets are restricted by what has previously been typed. Multifaceted search has the ability to show a variety of facets (or characteristics) of an item available on a commerce website (e.g., price and features). For example, when a user selects a particular facet (e.g., price), a multifaceted search updates remaining facets based on that choice.

In certain embodiments, when the suggestions are being generated, the suggestion system 150 uses the previous context of the search query to provide the user with result counts summarized by string values (i.e., enumerated) or through dynamic numeric ranges (e.g., price $20.00-$40.00). The values shown are determined by the user's meaning or intent, which are inferred based on a combination of terms that are submitted. That is, meaning or intent is inferred based on an understanding of term relationships (combinations), rather than treating each term individually. In certain embodiments, predefined grammars are used to combine terms input by a user (e.g., from the terms "LG phones" on a cell phone commerce website, the user's meaning or intent is inferred to be a desire for information on cell phones manufactured by LG). In certain embodiments, the incremental parser 152 identifies appropriate combinations of terms, and the suggestion system 150 uses this information and attribute information to know when the user has entered a value that is related to information in the tables with columns 176 (e.g., carrier=Verizon).

As another example, with user interface 200, if a user is looking to buy a cell phone made by 'Phone Company X' that sells for less than $50, the suggestion system 150 may provide suggestions of brands and price ranges that incrementally match the search query, as the user is inputting the search query. As the user adds more information into the search query, the suggestion system 150 tailors the suggestions to match the additional constraints provided by the search query. In certain embodiments, the suggestions offered up by the suggestion system 150 are phrased as complete thoughts (e.g., in a natural language format) to instruct and encourage the use of natural language queries.

Figure 3:
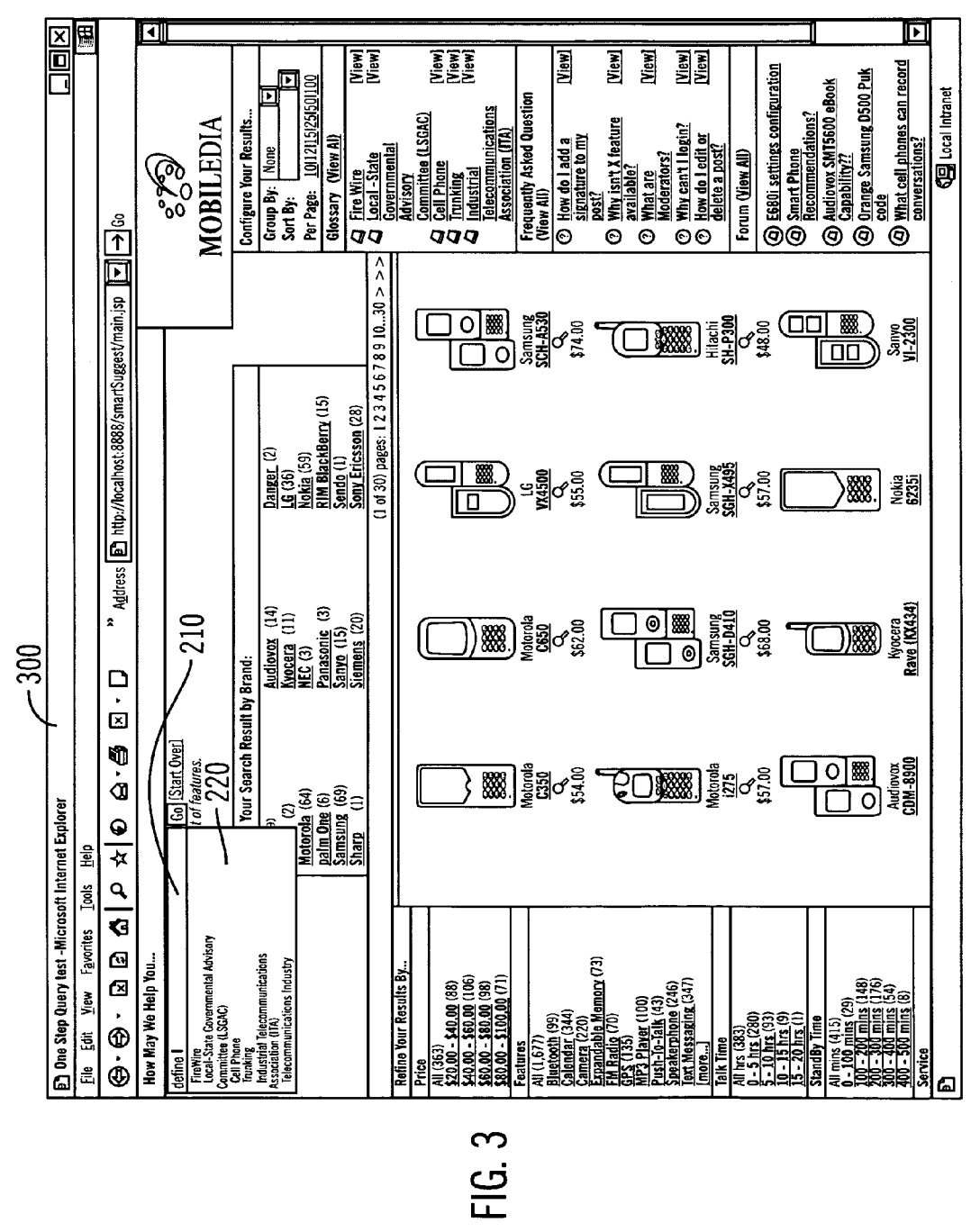

FIG. 3 illustrates use of a custom command in a sample user interface 300 in accordance with certain embodiments. In FIG. 3, the input into the query area 210 is "define". The suggestion system 150 recognizes that the user has input a custom command, which in this case is "define". Thus, the suggestion system 150 recognizes that the user is looking for a definition. Because the context of the search query is a cell phone commerce website, the suggestion system 150 provides terms in the suggestion area 220 that relate to cell phones to help the user complete the search query in the query area 210.

Figure 4:
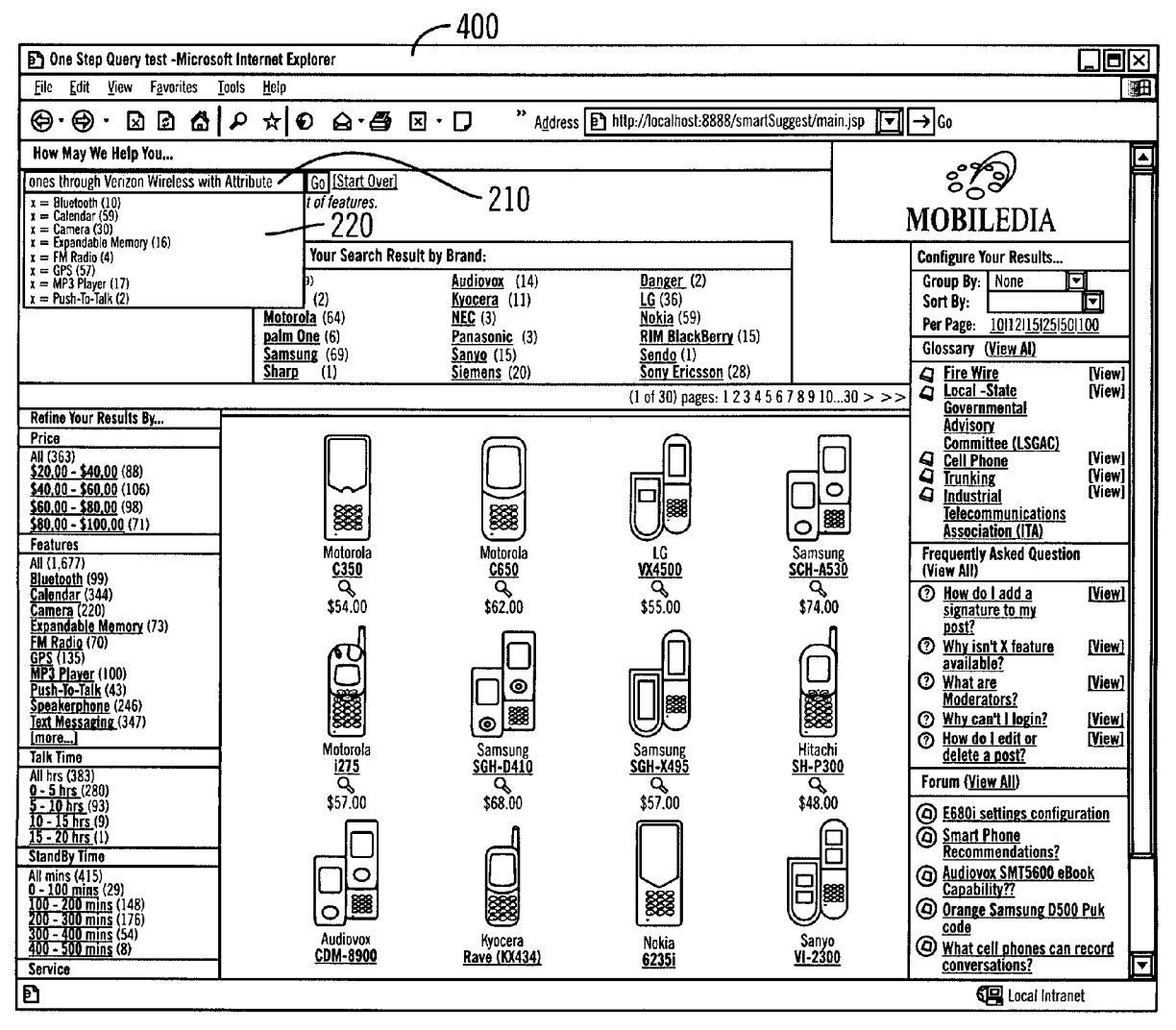

FIG. 4 illustrates use of an attribute in a sample user interface 400 in accordance with certain embodiments. In FIG. 4, the input into the query area 210 is "ones through Verizon Wireless with Attribute". Because the context of the search query is a cell phone commerce website and because the user had previously typed in "through Verizon Wireless", the suggestion system 150 recognizes that the user is looking for cell phones from the carrier Verizon Wireless. Additionally, when the input includes "with Attribute", the suggestion system 150 recognizes that the user is looking for cell phones from the carrier Verizon Wireless with certain attributes, and the suggestion system 150 provides suggested attributes in the suggestion area 220.

In certain embodiments, the user interface system 142 is a dynamic front end user interface that resides on a first computing device, which is coupled to a second computing device. In such embodiments, the second computing device is a backend search server, which includes the search engine 160.

The user interface system 142 provides the user with real-time suggestions as the user enters a search query.

Figure 5A:
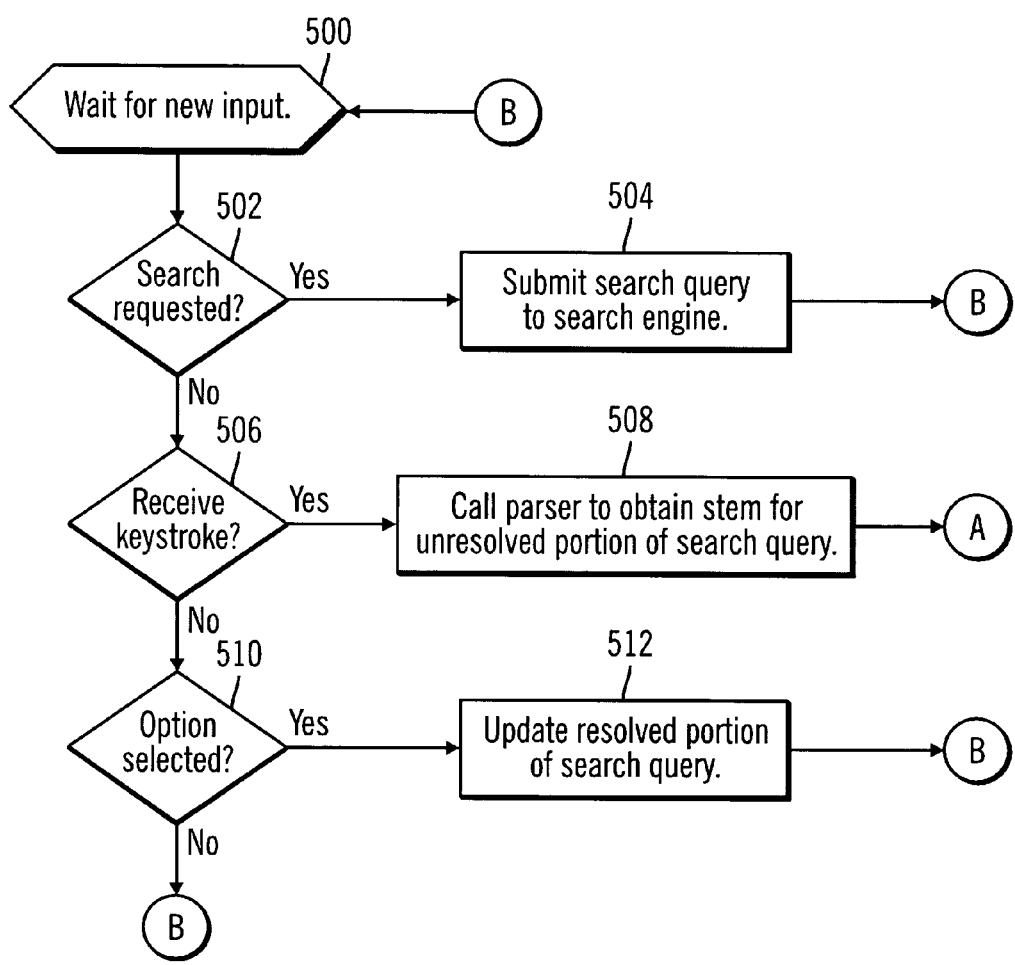
FIGS. 5A, 5B, and 5C illustrate logic for providing suggestions in accordance with certain embodiments.
Figure 5B:
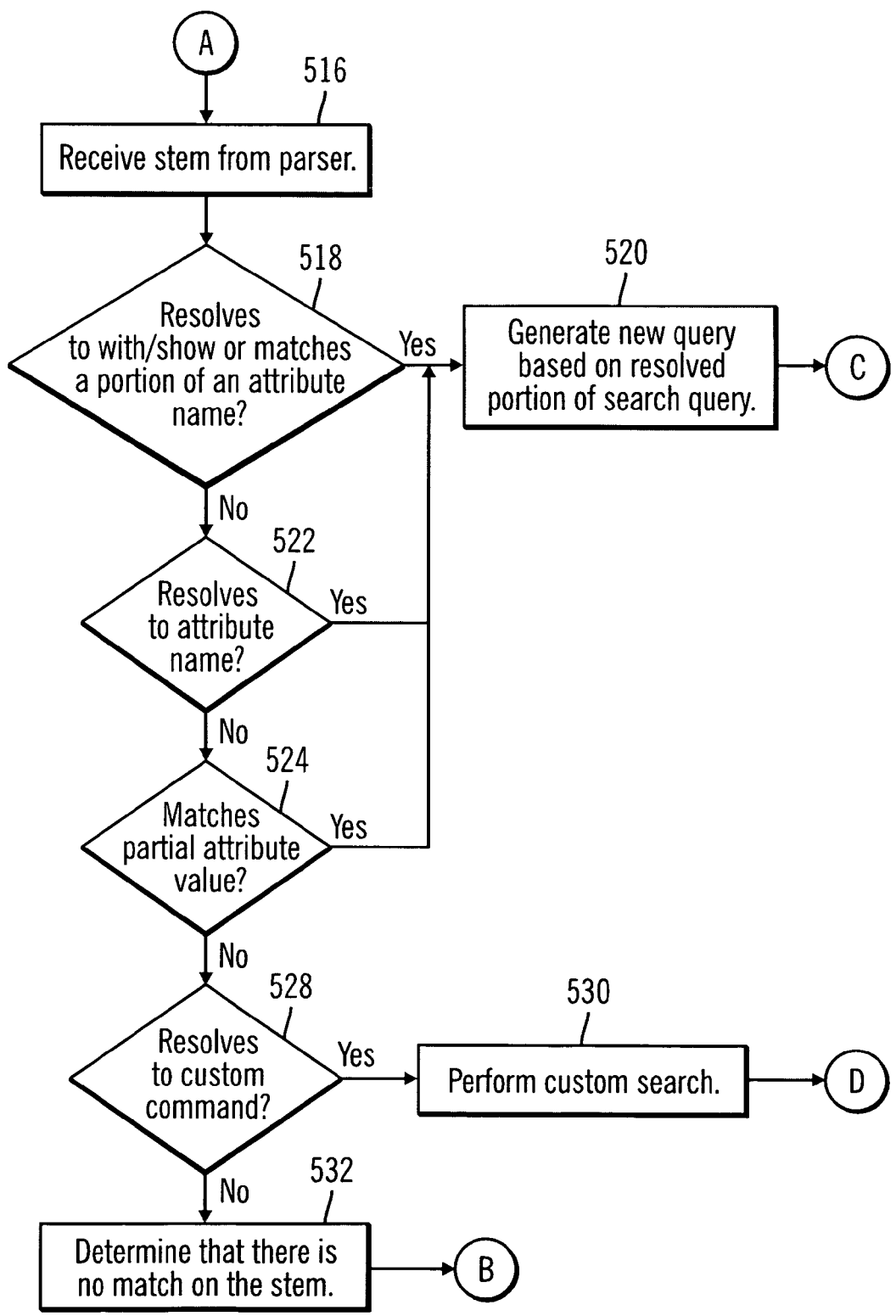
Figure 5C:
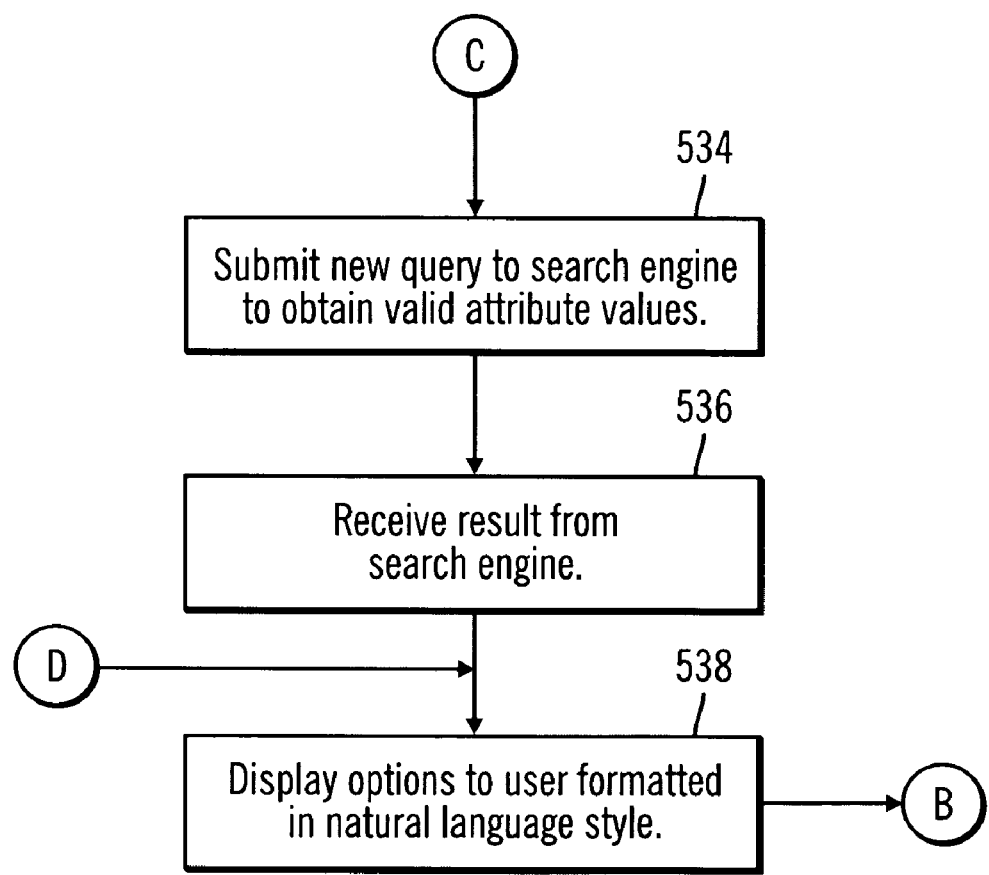

FIGS. 5A, 5B, and 5C illustrate logic for providing suggestions in accordance with certain embodiments. Control begins at block 500 with the suggestion system 150 waiting for input. When input is received, processing continues to block 502. In block 502, the suggestion system determines whether a search is requested (i.e., a resolved search query has been entered). In certain embodiments, the suggestion system 150 recognizes that the search is requested when the user submits particular input (e.g., enters GO next to the query area 210). If so, processing continues to block 504, otherwise, processing continues to block 506. In block 504, the suggestion system 150 submits the search query to the search engine 160 and processing returns to block 500 to wait for new input. The search engine 160 executes the search query and returns results to the user. In block 506, the suggestion system 150 determines whether a keystroke has been received. If so, processing continues to block 508, otherwise, processing continues to block 510. In block 508, the suggestion system 150 calls the parser 162 of the search engine 160 to obtain a stem for an unresolved portion of the search query. From block 508 (FIG. 5A), processing continues to block 516 (FIG. 5B).

In block 516, the suggestion system 150 receives a stem from the parser 162. In block 518, the suggestion system 150 determines whether the stem resolves to "with", "show", or matches a portion of an attribute name (e.g., matches "car", which is a portion of the attribute name "carrier"). In certain embodiments, the determination of whether the stem matches a portion of the attribute name may be performed with a substring match on the list of attributes 174. If the stem resolves to "with", "show", or matches a portion of an attribute name, processing continues to block 520, otherwise, processing continues to block 522.

In block 520, the suggestion system 150 automatically generates a new query (also referred to as a suggestion query to distinguish this query from the search query input by the user) based on the resolved portion of the search query (e.g., using "with", "show", or the portion of the attribute name and any previously resolved terms, such as "LG phones" entered before the "with"). In certain embodiments, the new query is a structured query (e.g., generated using a language such as Structured Query Language (SQL)). From block 520 (FIG. 5B), processing continues to block 534 (FIG. 5C). In block 534, the suggestion system 150 submits the new query to the search engine 160 to obtain valid attribute values. In block 536, the suggestion system 150 receives a result from the search engine 160. In block 538, the suggestion system 150 formats the result in a natural language style and displays this to the user (i.e., via the user interface 142). From block 538 (FIG. 3C), processing continues to block 500 (FIG. 5A) to wait for new input.

Returning to FIG. 5B, in block 522, the suggestion system determines whether the stem resolves to an attribute name (e.g., "carrier"). If so, processing continues to block 520, and the suggestion system 150 generates a new query based on the resolved portion of the search query to obtain valid attribute values for the resolved attribute name and processing continues to block 534 (FIG. 5C). Otherwise, processing continues to block 524. In block 524, the suggestion system determines whether the stem matches a partial attribute value (e.g., "Veriz" is a partial attribute value of the attribute value "Verizon" for the attribute "carrier"). If so, processing continues to block 520, otherwise, processing continues to block 528. In block 520, the suggestion system 150 generates a new query based on the resolved portion of the search query to obtain valid attribute values. From block 520 (FIG. 5B), processing continues to block 534 (FIG. 5C). In block 534, the suggestion system 150 submits the new query to the search engine 160 to obtain values (e.g., with a substring match) from valid attribute values.

Returning to FIG. 5B, in block 528, the suggestion system 150 determines whether the stem resolves to a custom command. If so, processing continues to block 530, otherwise, processing continues to block 532. In block 530, the suggestion system 150 performs a custom search (e.g., for the custom command "define", a glossary may be searched). From block 530 (FIG. 5B), processing continues to block 538 (FIG. 5C). In block 532, the suggestion system determines that that there is no match on the stem (e.g., the term is "phones" on a cell phone commerce website). From block 532 (FIG. 5B), processing continues to block 500 (FIG. 5A) to wait for new input.

Returning to FIG. 5A, in block 510, the suggestion system 150 determines whether an option has been selected (i.e., from one or more suggestions provided by the suggestion system 150). If so, processing continues to block 512, otherwise, processing continues to block 500 to wait for new input. In block 512, the suggestion system 150 updates the resolved portion of the search query. From block 512, processing continues to block 500 to wait for new input.

The incremental parser 152 extracts meaning or intent from the partial search query by determining which portions of the search query are resolved. The output from the incremental parser 152 is then used by the suggestion system 150 to generate suggestion queries. For example, in FIG. 4, the suggestion system 150 recognizes that the phrase "through Verizon Wireless" is complete, but that the phrase "with Attribute" is not complete. The suggestion system 152 analyzes the part that is not complete to determine the user's meaning or intent. In certain embodiments, the suggestion system 150 draws the meaning or intent from the explicit structured information in the search query, which allows for typed value suggestions (i.e., for numeric values, a range of possible values in the match set can be shown, and for text values a unique set can be shown, both with tally information).

This typed value suggestion provides value to the user by teaching the user how to ask natural language queries and by showing the end user context around a current search query while the user is typing. Both of these aspects reduce frustration and provide guidance in returning relevant results in response to what is being sought in a real-time, low-latency manner.

In particular, the suggestion system 150 applies to natural language processing and page/product metadata, rather than just keyword searching and phrase-matching. Natural language has many advantages over a simple keyword search, including more comfortable user experiences and quicker, more directed search capabilities that produce relevant results. The suggestion system 150 teaches users how to utilize and benefit from natural language queries.

Thus, embodiments infer information about the context (e.g., the meaning or intent) of what the user has entered so far, so that suggestions for completing the search query may be offered that make sense in that context, and these suggestions are provided in real-time in a natural language style.

Google is a registered trademark of Google Inc. in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 5A, 5B, and 5C describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 5A, 5B, and 5C may be implemented in software, hardware, programmable and nonprogrammable gate array logic or in some combination of hardware, software, or gate array logic.

Figure 6:
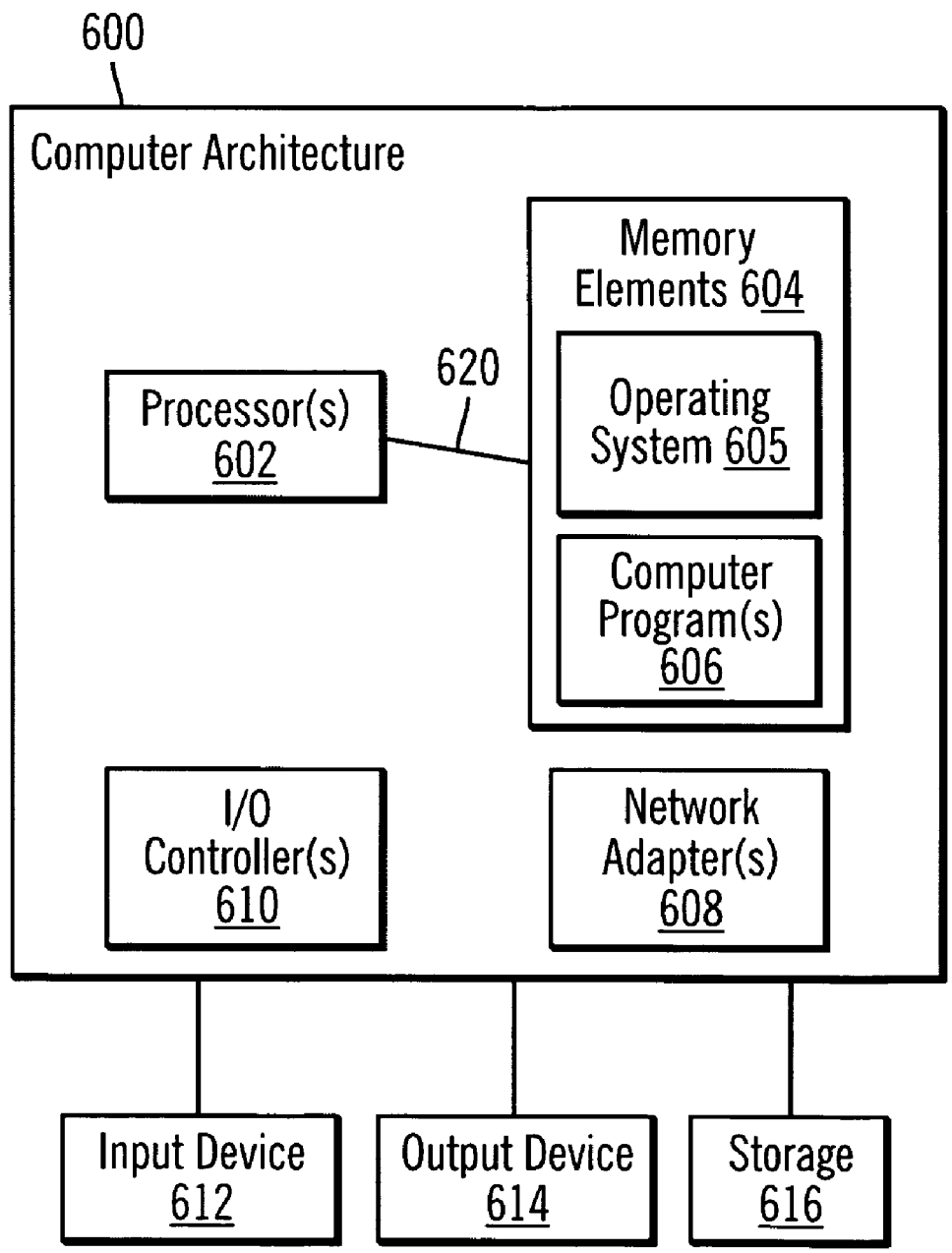
FIG. 6 illustrates a system architecture that may be used in accordance with certain embodiments.

FIG. 6 illustrates a system architecture 600 that may be used in accordance with certain embodiments. Computing device 130 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for providing suggestions for a search query, comprising:
    storing a dictionary of stems that includes custom commands and synonyms;
    storing a list of attributes that correlates synonyms found in the dictionary of stems with attributes in the list of attributes, wherein there are multiple attributes for a particular item;
    maintaining a record of resolved terms that have been identified as predetermined terms and other terms that are identified as not being predetermined terms;
    receiving a new input for a search query before the user submits a complete search query, wherein the search query includes the resolved terms, the other terms, and the input;
    determining that the input corresponds to a stem;
    determining whether the stem or a synonym of the stem resolve to a predetermined term using the dictionary of stems and the list of attributes; and
    in response to determining that the stem resolves to a predetermined term,
        generating a suggestion query with the predetermined term and previously resolved terms in a resolved portion of the search query and without using the other terms that are identified as not being predetermined terms, wherein the previously resolved terms are terms that were identified as predetermined terms prior to generating the suggestion query;
        executing the suggestion query with a search engine, wherein the suggestion query includes the predetermined term and the previously resolved terms;
        in response to executing the suggestion query, receiving results from the search engine; and
        displaying context-dependent suggestions of additional terms for completing the search query based on the received results, comprising:
            when the predetermined term is an attribute name that is on the list of attributes, displaying valid attribute values for the attribute name; and
            when the predetermined term is define, returning a list of terms representing concepts for which context-relevant definitions are available.

2. The method of claim 1, further comprising:
    determining that the input indicates that the search query has been submitted; and
    submitting the search query to the search engine.

3. The method of claim 1, further comprising:
    determining that the input indicates that an option from among the suggestions for completing the search query has been selected by one of a user and an application; and
    in response to determining that the input indicates that the option from among the suggestions for completing the search query has been selected, updating the resolved portion of the search query.

4. The method of claim 1, wherein the results are provided in the natural language style in real-time.

5. The method of claim 1, wherein the input comprises a keystroke.

6. The method of claim 1, wherein the predetermined term is a custom command and wherein generating the new query comprises performing a custom search.

7. The method of claim 1, wherein the predetermined term is one of the attribute name, a custom command, a partial attribute value, a term of with a term of show, and a portion of an attribute name.

8. A computer program product comprising a computer readable storage medium including a computer readable program, wherein the computer readable program when executed by a processor on a computer causes the computer to:
    store a dictionary of stems that includes custom commands and synonyms;
    store a list of attributes that correlates synonyms found in the dictionary of stems with attributes in the list of attributes, wherein there are multiple attributes for a particular item;
    maintain a record of resolved terms that have been identified as predetermined terms and other terms that are identified as not being predetermined terms;
    receive a new input for a search query before the user submits a complete search query, wherein the search query includes the resolved terms, the other terms, and the input;
    determine that the input corresponds to a stem;
    determine whether the stem or a synonym of the stem resolve to a predetermined term using the dictionary of stems and the list of attributes; and
    in response to determining that the stem resolves to a predetermined term,
        generate a suggestion query with the predetermined term and previously resolved terms in a resolved portion of the search query and without using the other terms that are identified as not being predetermined terms, wherein the previously resolved terms are terms that were identified as predetermined terms prior to generating the suggestion query;
        execute the suggestion query with a search engine, wherein the suggestion query includes the predetermined term and the previously resolved terms;
        in response to executing the suggestion query, receive results from the search engine; and
        display context-dependent suggestions of additional terms for completing the search query based on the received results, comprising:
            when the predetermined term is an attribute name that is on the list of attributes, displaying valid attribute values for the attribute name; and when the predetermined term is define, returning a list of terms representing concepts for which context-relevant definitions are available.

9. The computer program product of claim 8, wherein the computer readable program when executed on a computer causes the computer to:
determine that the input indicates that the search query has been submitted; and
submit the search query to the search engine.

10. The computer program product of claim 8, wherein the computer readable program when executed on a computer causes the computer to:
determine that the input indicates that an option from among the suggestions for completing the search query has been selected by one of a user and an application; and
in response to determining that the input indicates that the option from among the suggestions for completing the search query has been selected, update the resolved portion of the search query.

11. The computer program product of claim 8, wherein the predetermined term is one of the attribute name, a custom command, a partial attribute value, a term of with, a term of show, and a portion of an attribute name.

12. The computer program product of claim 8, wherein the results are provided in the natural language style in real-time.

13. The computer program product of claim 8, wherein the input comprises a keystroke.

14. The computer program product of claim 8, wherein the predetermined term is a custom command and wherein generating the new query comprises performing a custom search.

15. A system for providing suggestions for a search query, comprising:
hardware logic capable of performing operations, the operations comprising:
storing a dictionary of stems that includes custom commands and synonyms;
storing a list of attributes that correlates synonyms found in the dictionary of stems with attributes in the list of attributes, wherein there are multiple attributes for a particular item;
maintaining a record of resolved terms that have been identified as predetermined terms and other terms that are identified as not being predetermined terms;
receiving a new input for a search query before the user submits a complete search query, wherein the search query includes the resolved terms, the other terms, and the input;
determining that the input corresponds to a stem;
determining whether the stem or a synonym of the stem resolve to a predetermined term using the dictionary of stems and the list of attributes; and
in response to determining that the stem resolves to a predetermined term,
generating a suggestion query with the predetermined term and previously resolved terms in a resolved portion of the search query and without using the other terms that are identified as not being predetermined terms, wherein the previously resolved terms are terms that were identified as predetermined terms prior to generating the suggestion query;
executing the suggestion query with a search engine, wherein the suggestion query includes the predetermined term and the previously resolved terms;
in response to executing the suggestion query, receiving results from the search engine; and
displaying context-dependent suggestions of additional terms for completing the search query based on the received results, comprising:
when the predetermined term is an attribute name that is on the list of attributes, displaying valid attribute values for the attribute name; and
when the predetermined term is define, returning a list of terms representing concepts for which context-relevant definitions are available.

16. The system of claim 15, wherein the operations further comprise:
determining that the input indicates that the search query has been submitted; and
submitting the search query to the search engine.

17. The system of claim 15, wherein the operations further comprise:
determining that the input indicates that an option from among the suggestions for completing the search query has been selected by one of a user and an application; and
in response to determining that the input indicates that the option from among the suggestions for completing the search query has been selected, updating the resolved portion of the search query.

18. The system of claim 15, wherein the predetermined term is one of the attribute name, a custom command, a partial attribute value, a term of with, a term of show, and a portion of an attribute name.

19. The system of claim 15, wherein the results are provided in the natural language style in real-time.

20. The system of claim 15, wherein the input comprises a keystroke.

21. The system of claim 15, wherein the predetermined term is a custom command and wherein generating the new query comprises performing a custom search.

* * * * *